E. W. GREINER.
NUT LOCK.
APPLICATION FILED MAR. 12, 1912.
1,039,274.
Patented Sept. 24, 1912.
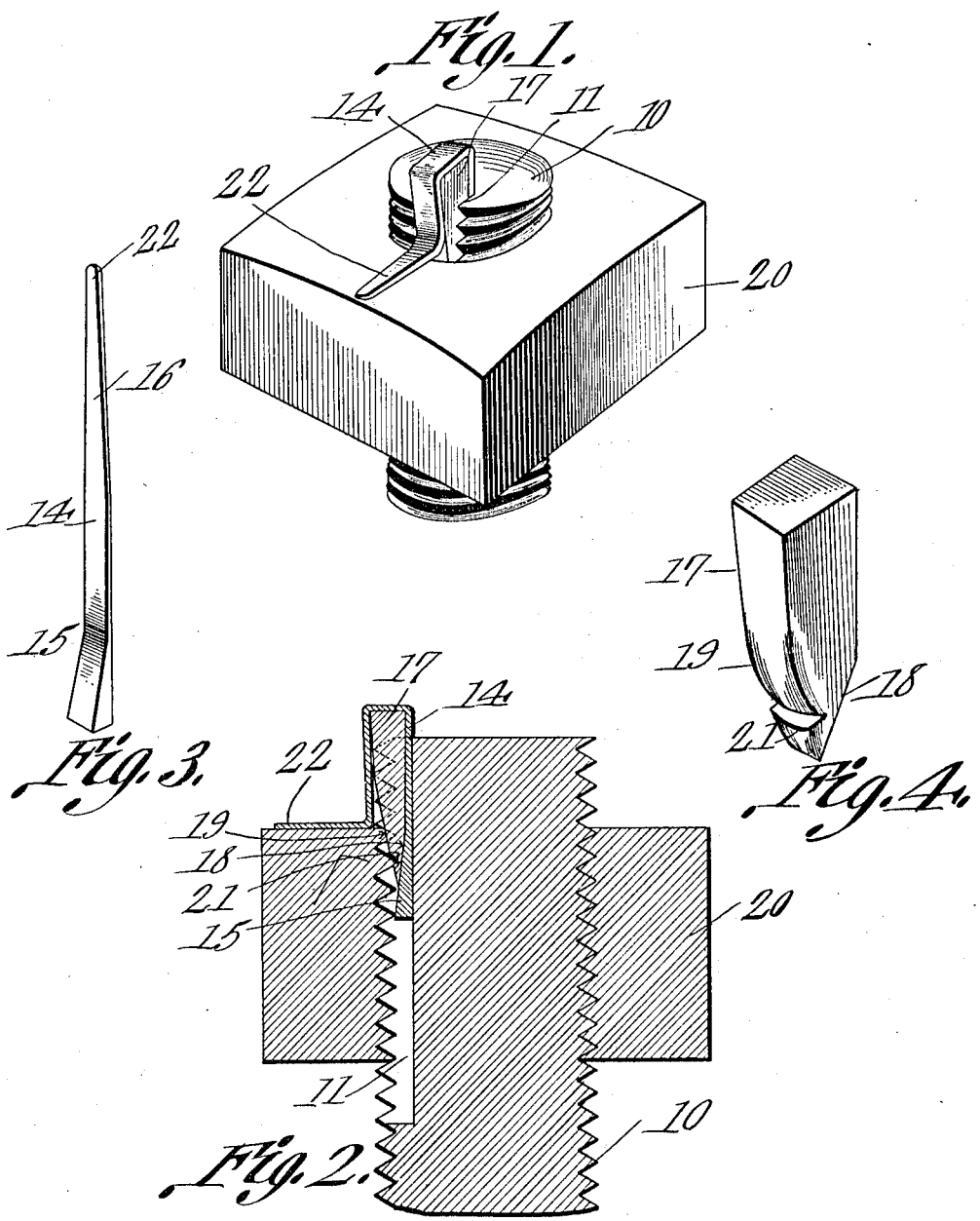
Ernst W. Greiner
Inventor

UNITED STATES PATENT OFFICE.

ERNST W. GREINER, OF WILLIAMSBURG, PENNSYLVANIA.

NUT-LOCK.

1,039,274.  Specification of Letters Patent.  Patented Sept. 24, 1912.

Application filed March 12, 1912. Serial No. 683,228.

*To all whom it may concern:*

Be it known that I, ERNST W. GREINER, a citizen of the United States, residing at Williamsburg, in the county of Blair and State of Pennsylvania, have invented a new and useful Nut-Lock, of which the following is a specification.

This invention relates to an improvement in nut locks.

The primary object of the present invention is to provide a means for retaining a nut against accidental displacement, the retaining means being capable of removal, to allow for the displacement of the nut.

In the drawings—Figure 1 is a perspective view of the device in position. Fig. 2 is a longitudinal section. Fig. 3 is a detail view of the flexible key. Fig. 4 is a detail view of the wedge.

In the drawings, 10 designates a bolt, one end of which is screw threaded, said end being formed with a longitudinal groove or channel 11. The locking mechanism consists of the flexible key 14, one of the terminals of said key being enlarged to form the beveled extension 15. In assembling the locking mechanism, the key 14 is inserted within the slot 11 of the bolt, the beveled terminal 15 being extended within the slot, the flexible end portion 16 of the key 14 extending beyond the bolt. The locking key 17 is then inserted. This key consisting of a pin which is substantially square in cross section, the face 19 being rounded to conform to the curvature of the bolt, thus facilitating the insertion of the same, the lower terminal which enters the slot 11 in the bolt, being tapered, the space 18 of the same contacting with the beveled extension 16 of the key 14 to force the base 19 in contact with the screw threads of the nut 20. The base 19 is provided with the transverse V-shaped slot 21 which receives one of the screw threads, preferably the second thread of the nut, the pin 17 being driven in, the contact of its beveled face 18 with the beveled extension 15 of the key 14 forcing the same in contact with the nut. It will be noted by this construction that the pin 17 in this position, and the key 16 having been pulled outward thus forcing wedge 15 under the nose of 17, preventing its displacement, the key 18 being held in contact with the notched slot 21 of said key and receiving one of the threads of the same, preventing the displacement of the pin, the flexible end portion 16 of the key 14 may be bent to embrace the pin, its terminal 22 resting upon the nut.

It will be noted by this construction that any movement of the nut toward the end of the bolt will serve to force the pin 17 in contact with the key 14, thus tightly wedging the nut on the bolt and preventing its displacement. When it is desired to remove the nut, the terminal of the key 14 which has been bent to embrace the pin 17, is straightened allowing the pin 17 to be removed. After the pin has been removed, the key 14 may be withdrawn.

The many advantages of a locking device of this character will be clearly apparent and it is to be noted that while the nut may be securely held against displacement, the locking means may be readily removed when it is desired to remove the nut. Attention is also brought to the fact that the locking member may be easily and economically manufactured.

What is claimed is:

1. In a nut lock, a bolt the threaded end portion of which is provided with a longitudinal slot, a flexible key, arranged to extend within said slot, the terminal of said key which rests within said slot being formed with a tapered enlargement, and a tapered key arranged to extend within said slot, said key being interposed between the first mentioned key and the nut, said key being provided with a transverse slot, the terminal of the first mentioned key being bent to embrace the second mentioned key.

2. In a nut lock, a bolt, the screw threaded terminal of which is provided with a longitudinal slot, a flexible key arranged within said slot, said key being formed with a tapered enlargement, a second key the terminal of said key which extends within said slot being beveled, and arranged to contact with the beveled enlargement of the first mentioned key, one of the bevel faces of said key being formed with a transverse groove arranged to receive the screw threads of the nut, the first mentioned key being bent to embrace the second mentioned key.

In testimony that I claim the foregoing as my own, I have hereto affixed my signature in the presence of two witnesses.

ERNST W. GREINER.

Witnesses:
WM. D. LIBBY,
ANDREW GAILEY.

Copies of this patent may be obtained for five cents each, by addressing the "Commissioner of Patents, Washington, D. C."